(12) United States Patent
Nakamura et al.

(10) Patent No.: US 9,729,194 B2
(45) Date of Patent: Aug. 8, 2017

(54) CLOCK CONTROL CIRCUIT, DEMODULATION DEVICE AND SPREAD SPECTRUM METHOD

(71) Applicant: Renesas Electronics Corporation, Kawasaki-shi, Kanagawa (JP)

(72) Inventors: Atsushi Nakamura, Kanagawa (JP); Masahiro Toyama, Kanagawa (JP); Masafumi Watanabe, Kanagawa (JP); Kota Toida, Kanagawa (JP); Aya Ohmae, Kanagawa (JP); Wen Li, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 466 days.

(21) Appl. No.: 13/739,997

(22) Filed: Jan. 11, 2013

(65) Prior Publication Data
US 2013/0182747 A1  Jul. 18, 2013

(30) Foreign Application Priority Data
Jan. 16, 2012  (JP) .................................. 2012-005893

(51) Int. Cl.
H04B 1/707 (2011.01)
H04B 1/7073 (2011.01)
H04B 15/04 (2006.01)

(52) U.S. Cl.
CPC .......... *H04B 1/7073* (2013.01); *H04B 15/04* (2013.01)

(58) Field of Classification Search
USPC ................... 375/145, 147, 350, 271, 282
See application file for complete search history.

(56) References Cited

U.S. PATENT DOCUMENTS

| | | | |
|---|---|---|---|
| 6,975,148 B2 | 12/2005 | Miyata et al. | |
| 2002/0094034 A1* | 7/2002 | Moriyama | ................... 375/271 |
| 2003/0168662 A1* | 9/2003 | Pandey | ........................... 257/74 |
| 2004/0165686 A1* | 8/2004 | Siwiak | .......................... 375/350 |
| 2005/0285582 A1* | 12/2005 | Azuma et al. | ................ 323/282 |

FOREIGN PATENT DOCUMENTS

| | | |
|---|---|---|
| JP | 2004-207846 A | 7/2004 |
| JP | 2004-208037 A | 7/2004 |

* cited by examiner

*Primary Examiner* — Eva Puente
(74) *Attorney, Agent, or Firm* — McGinn IP Law Group, PLLC

(57) ABSTRACT

To provide a clock control circuit, a demodulation device, and a spread spectrum method, which can reduce interference caused by a clock signal on which spread spectrum is performed when demodulating a signal. A clock controller 22 according to the present invention disperses a harmonic of a clock signal in a used frequency band of a reception signal and controls a harmonic remaining in the used frequency band after the dispersion. For example, the clock controller 22 controls an amplitude of the harmonic on the basis of a spread frequency used for the dispersion and a spread width of the harmonic.

8 Claims, 16 Drawing Sheets

FIG. 2

| USED CHANNEL | SPREAD FREQUENCY | SPREAD WIDTH % |
|---|---|---|
| 1 | 252kHz | 1.25 |
| 2 | 420kHz | 5.14 |
| 3 | - | - |
| 4 | 352kHz | 3.47 |
| ⋮ | ⋮ | ⋮ |

(A) SPREAD SPECTRUM

ENLARGED DIAGRAM OF ※ PORTION

Related Art (A) ENLARGED DIAGRAM OF SPREAD SPECTRUM PORTION

CLOCK CONTROL CIRCUIT, DEMODULATION DEVICE AND SPREAD SPECTRUM METHOD

CROSS-REFERENCE TO RELATED APPLICATION

The disclosure of Japanese Patent Application No. 2012-005893 filed on Jan. 16, 2012 including the specification, drawings and abstract is incorporated herein by reference in its entirety.

BACKGROUND

The present invention relates to a clock control circuit that performs spread spectrum.

It is known that electromagnetic noise radiated from a semiconductor device affects other devices. A spread spectrum clock is generally used to satisfy an EMI regulation value that defines a regulation value related to the noise. The spread spectrum clock is a clock to which a frequency swing is added. As shown in FIG. 21, it is possible to perform control so as to lower a peak value of a spectrum of a clock by using the spread spectrum clock. The spectrum of the clock is determined by a modulation waveform for adding a frequency swing.

Japanese Patent Laid-Open No. 2004-207846 (Patent Document 1) discloses a control method for temporally changing a period of frequency variation of the spread spectrum clock by temporally changing a period of amplitude of a voltage waveform input into a VCO. Peaks of the clock are flattened by controlling as described above.

Japanese Patent Laid-Open No. 2004-208037 (Patent Document 2) discloses a control method for temporally changing a frequency variation width of the spread spectrum clock by temporally changing an output amplitude of a voltage waveform input into a VCO. Peaks of the clock are flattened by controlling as described above.

SUMMARY

When the control methods of the spread spectrum clock disclosed in Patent Documents 1 and 2 are applied to digital wireless communication, the problems as described below occur. In the digital wireless communication using OFDM (Orthogonal frequency-division multiplexing) or the like, there is a division channel called a sub-channel in a channel used for the communication (hereinafter referred to as a communication use channel). In the digital wireless communication, information is transmitted by using the sub-channel. Although a peak value of the spectrum can be relatively lowered by using the spread spectrum clock, as shown in FIG. 22, a peak occurs for each period of the spread frequency. Therefore, a plurality of occurring peaks and the sub-channel interfere with each other, so that a problem occurs that reception quality degrades.

Therefore, it is considered that the spread frequency is raised and frequency intervals at which a peak occurs are increased so that the sub-channel and the spectrum do not interfere with each other. However, when the spread frequency is raised, various problems occur as described below. For example, in a spread spectrum clock generator (SSCG) which generates a spread frequency, the higher the spread frequency is, the more difficult an accurate control of the spread width is. Further, when the spread frequency is raised, the number of spectra generated in the spread width decreases. Therefore, the energy in the spectra is not dispersed, so that the peak positions of the spectra are generally high. When the spread frequency is low, the number of spectra generated in the spread width increases. In this case, the energy in the spectra is dispersed, so that the peak positions of the spectra are generally low. However, the number of interferences to the sub-channel increases and the reception quality degrades.

A clock control circuit according to a first aspect of the present invention disperses a harmonic of a clock signal and controls an amplitude of the dispersed signal on the basis of the spread frequency and the spread width.

Thereby, the amplitude of the clock signal after spread spectrum of the clock signal can be reduced. Thus, the interference of the clock signal after spread spectrum can be reduced.

A demodulation device according to a second aspect of the present invention disperses a harmonic of a clock signal and demodulates a signal by using a clock signal generated by controlling an amplitude of the dispersed signal on the basis of the spread frequency and the spread width.

Thereby, the amplitude of the clock signal after spread spectrum of the clock signal can be reduced. Thus, the interference of the clock signal after spread spectrum can be reduced.

A spread spectrum method according to a third aspect of the present invention disperses a harmonic of a clock signal and controls an amplitude of the dispersed signal on the basis of the spread frequency and the spread width.

Thereby, the amplitude of the clock signal after spread spectrum of the clock signal can be reduced. Thus, the interference of the clock signal after spread spectrum can be reduced.

According to the present invention, it is possible to provide a clock control circuit, a demodulation device, and a spread spectrum method, which can reduce interference caused by a clock signal on which spread spectrum is performed when demodulating the signal.

BRIEF DESCRIPTION OF THE DRAWINGS

FIG. 2 is a configuration diagram of a clock control table according to the first embodiment;

DETAILED DESCRIPTION

First Embodiment

Figure 1:
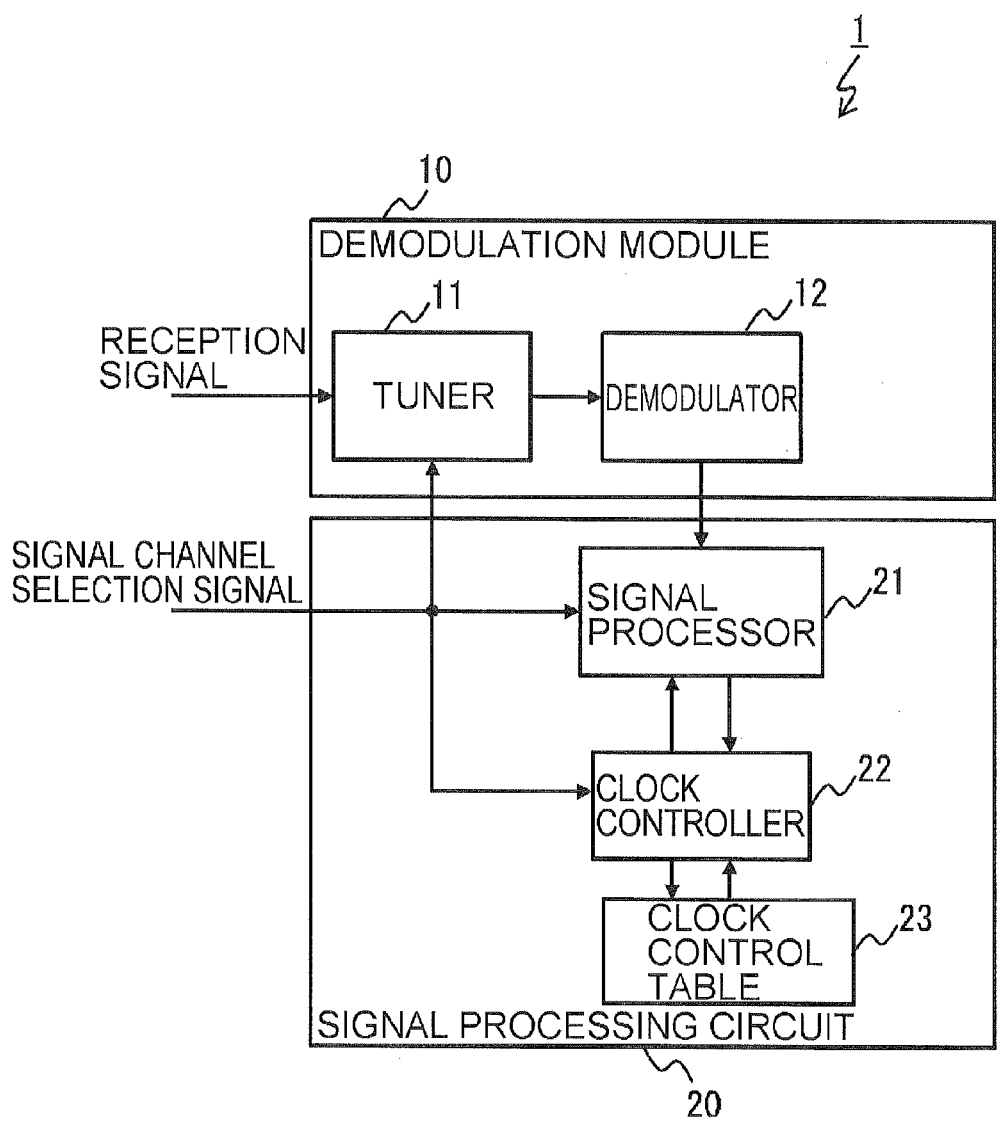
FIG. 1 is a configuration diagram of a demodulation device according to a first embodiment.

Hereinafter, embodiments of the present invention will be described with reference to the drawings. A configuration example of a demodulation device 1 according to a first embodiment of the present invention will be described with reference to FIG. 1. The demodulation device 1 includes a demodulation module 10 and a signal processing circuit 20. The demodulation module 10 has a tuner 11 and a demodulator 12. The signal processing circuit 20 has a signal processor 21, a clock controller 22, and a clock control table 23.

The demodulation device 1 is included, for example, in a TV receiver, a mobile phone terminal, and a wireless LAN receiver, and the like. In other words, the demodulation device 1 is included in a device that can receive a wireless signal. Alternatively, the demodulation device 1 may be externally coupled to the device that can receive the above-described wireless signal.

The demodulation module 10 demodulates a reception signal. The tuner 11 receives the reception signal and extracts a signal of a desired frequency band or the like. For example, the tuner 11 receives a signal channel selection signal and extracts a signal of a desired frequency band on the basis of the signal channel selection signal.

For example, when the demodulation device 1 is used in a TV receiver, the signal channel selection signal may be a signal that indicates channel information which a user wants to view. In this case, the tuner 11 extracts a signal of a frequency band corresponding to the channel information. Alternatively, for example, when the demodulation device 1 is used in a wireless LAN receiver, the signal channel selection signal may be a signal that indicates information on a communication channel used between a base unit which supplies a wireless LAN radio wave and a cordless handset which receives the wireless LAN radio wave. The demodulation module 10 outputs the extracted signal of the frequency band to the demodulator 12.

The demodulator 12 demodulates the signal output from the tuner 11. The demodulator 12 outputs the demodulated signal to the signal processor 21.

Next, components of the signal processing circuit 20 will be described.

As shown in FIG. 2, the clock control table 23 manages a used channel, and a spread frequency and a spread width which are used for the spread spectrum clock, in association with each other. The unit of the spread frequency is kHz. The spread width represents a ratio of a swing width of a frequency to a harmonic frequency. For example, in the case of the used channel 1, the spread frequency is set to 252 kHz and the spread width is set to a range of ±1.25% of the harmonic frequency. Here, the spread width and the spread frequency will be described with reference to FIG. 3.

Figure 3:
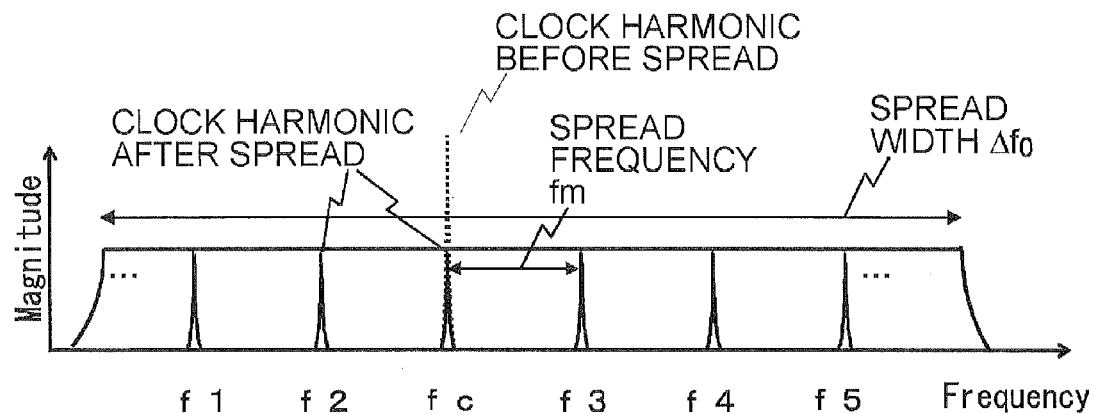
FIG. 3 is a diagram for explaining spread spectrum according to the first embodiment.

In FIG. 3, the vertical axis represents a signal strength or a signal amplitude and the horizontal axis represents a frequency. The frequency fc represents a clock harmonic frequency generated before spreading clock. The frequencies f1 to f5 represent a clock harmonic frequency generated after spreading clock. The spread frequency fm represents a frequency difference between a harmonic and an adjacent harmonic. The spread width $\Delta f_0$ represents a width of a frequency band in which a clock harmonic before spread is spread.

Returning to FIG. 1, the clock controller 22 extracts a spread frequency and a spread width set when spreading spectrum of the clock signal on the basis of used channel information indicated in the signal channel selection signal. The clock controller 22 spreads spectrum of the clock signal by using the extracted spread frequency and spread width. The clock controller 22 outputs a spread spectrum clock after the spread spectrum to the signal processor 21.

The signal processor 21 generates reception data by using the demodulated signal output from the demodulator 12 and the spread spectrum clock signal.

Figure 4:
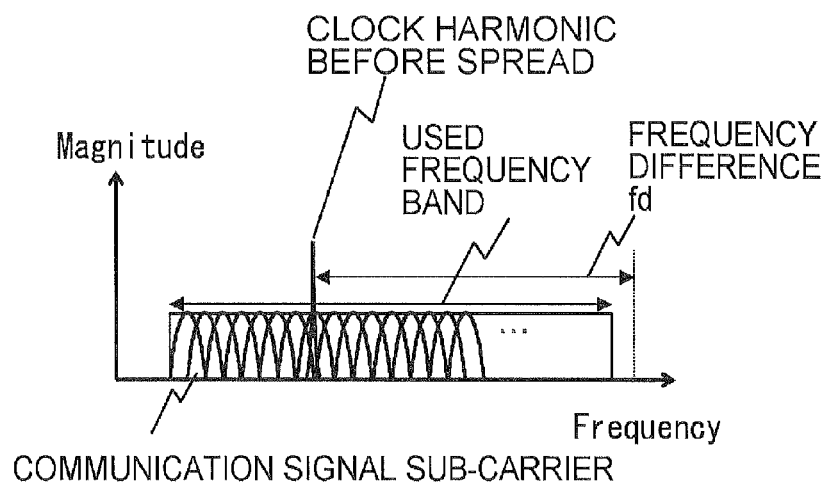
FIG. 4 is a diagram for explaining a used frequency band and a spread frequency according to the first embodiment.
Figure 5:
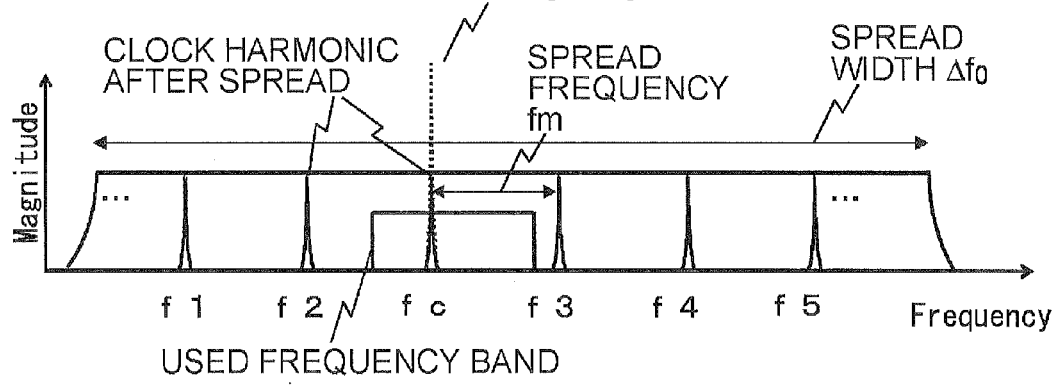
FIG. 5 is a diagram for explaining the spread spectrum according to the first embodiment.

Next, spread spectrum processing in the clock controller 22 will be described. First, a relationship between the used frequency band of the used channel indicated in the signal channel selection signal and the spread frequency will be described with reference to FIG. 4. FIG. 4 shows a case in which there is a clock harmonic in the used frequency band of the reception signal. The used frequency band is associated with a used channel. The clock harmonic has a spectrum at the frequency fc. Hereinafter, the frequency fc is referred to as a clock harmonic frequency fc. In this case, the spread frequency fm is set to be equal to or higher than a frequency difference fd between the clock harmonic frequency fc and a frequency outside the used frequency band. When the spread spectrum is performed by using the spread frequency fm thus determined, the number of peaks in the used frequency band is only one as shown in FIG. 5. Further, when the spread spectrum is performed, the peak value of the spectrum generated in the used frequency band decreases. Here, the clock signal includes jitter. Therefore, the spectrum is dispersed by the jitter, so that, when the frequency difference fd is calculated, it is desirable that the frequency difference fd is calculated considering the dispersion.

Subsequently, a method of calculating the spread width will be described. The principle of the spread spectrum is frequency modulation. For ease of description, the method will be described below using a sine wave.

[Formula 1]

$$v_c = V_c \sin \omega_c t \quad (1)$$

On a carrier wave (clock harmonic) of the formula (1),

[Formula 2]

$$v_m = T_m \sin \omega_m t \quad (2)$$

when the frequency modulation is performed by using a spread wave of the formula (2),

[Formula 3]

$$v = V_c \sin\theta_m \\ = V_c \sin(\omega_c t + \Delta\omega t) \\ = V_c \sin(\omega_c t - m\cos\omega_m t) \quad (3)$$

the formula (1) is converted into the formula (3). At this time, m is a degree of modulation and represented by the formula (4) as a ratio between the spread width Δfc and the spread frequency fm.

[Formula 4]

$$m = \frac{\Delta\omega_c}{\omega_m} = \frac{\Delta f_c}{f_m} \quad (4)$$

The term of sin in the formula (3) is expanded as shown by the formula (5) by using the Bessel function.

[Formula 5]

$$\sin(\omega_c t - m\cos\omega_m t) = \\ J_0(m)\sin\omega_c t - J_1(m)(\cos(\omega_c + \omega_m)t + \cos(\omega_c - \omega_m)t) - \\ J_2(m)(\sin(\omega_c + 2\omega_m)t + \sin(\omega_c - 2\omega_m)t) - \ldots \quad (5)$$

The spectrum after the frequency modulation is represented by using the clock harmonic frequency fc before the spread spectrum and a difference between the clock harmonic frequency fc and the frequency of the spread wave (spread frequency) fm as shown in the second and subsequent terms in the formula (5). In addition, the peak value of the spectrum after the frequency modulation is an amplitude of the formula (5) and represented by using the first kind Bessel function ($J_0$, $J_1$, and $J_2$) of the formula (6).

[Formula 6]

$$J_n(m) = \frac{1}{2\pi} \int_0^{2\pi} \cos(n\theta - m\sin\theta) d\theta \quad (6)$$

Figure 6:
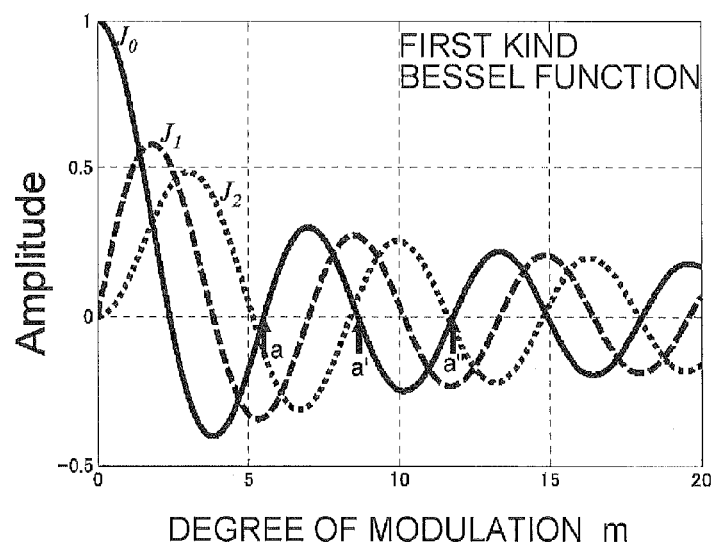
FIG. 6 is a diagram showing a first kind Bessel function according to the first embodiment.

As shown in FIG. 6, the value of the first kind Bessel function is determined by the degree of modulation m. In FIG. 6, the vertical axis represents the degree of modulation and the horizontal axis represents the amplitude value. The spectrum remaining in the frequency band used by the communication after the spread spectrum is the first term in the formula (5). Therefore, for example, m by which the value of the first kind and zeroth-order Bessel function ($J_0$) is near zero, such as a, a', and a'' in FIG. 6, is selected, and further the spread width Δf is obtained from m and the spread frequency fm by using the formula (4).

Figure 7:
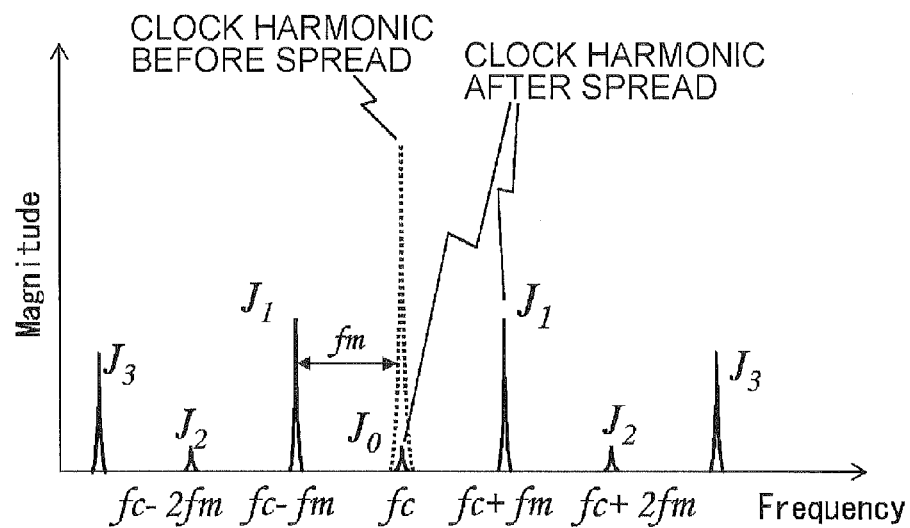
FIG. 7 is a diagram for explaining the spread spectrum according to the first embodiment.
Figure 8:
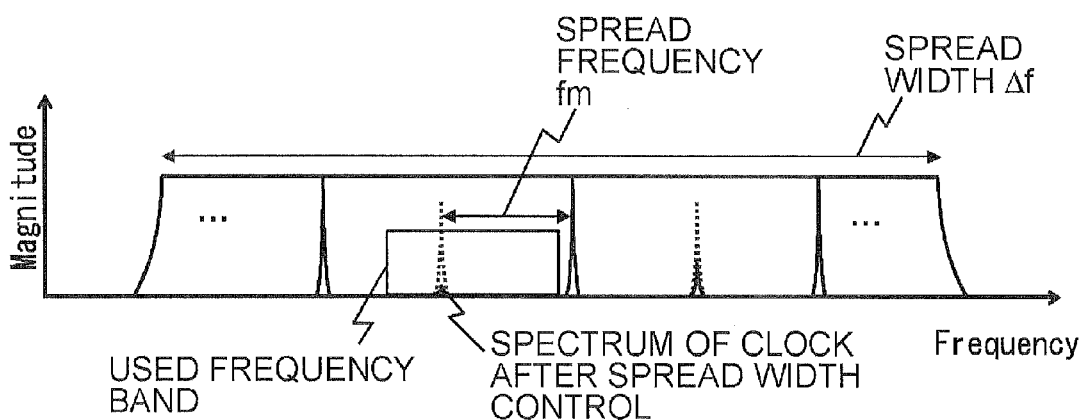
FIG. 8 is a diagram for explaining the spread spectrum according to the first embodiment.

When the spread spectrum is performed by using the spread frequency fm and the spread width Δf obtained as above, as shown in FIG. 7, the peak value of the spectrum at a position at which the clock harmonic frequency fc before the spread spectrum was located decreases. Further, the other peaks are dispersed to the outside of the used frequency band, so that, as shown in FIG. 8, it is possible to remove noise in the used frequency band. In this way, an optimal spread frequency fm is determined from a position of the harmonic of the clock for a communication channel in which electromagnetic interference is generated by the clock harmonic. Further, the spread width Δf is calculated by using the degree of modulation m and managed in a table as shown in FIG. 2. The degree of modulation m is determined by using the first kind Bessel function. When a channel in which interference occurs is selected, the table is referred to and the spread spectrum is performed on the clock according to information of the spread frequency and the spread width in the table. When a channel in which no interference occurs is selected, the spread spectrum need not be performed.

Figure 9:
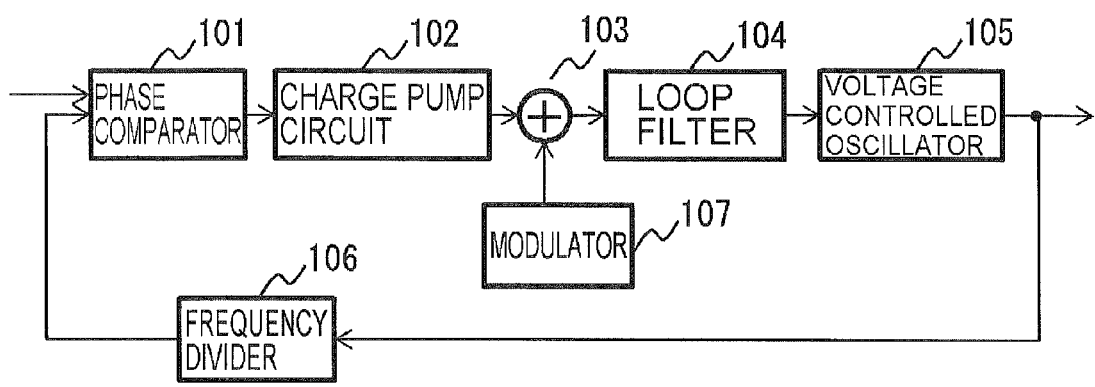
FIG. 9 is a configuration diagram of a general PLL circuit.

When the spread spectrum of the above-described method is performed, generally, as shown in FIG. 9, the clock controller is formed by a PLL circuit including a phase comparator (PFD) 101, a charge pump circuit (CP) 102, an adder 103, a loop filter 104, a voltage controlled oscillator (VCO) 105, a frequency divider (DIV) 106, and a modulator 107. In a general PLL circuit shown in FIG. 9, there is a problem that even when a variation range of a modulation signal output from the modulator 107 is constant, a variation range of the frequency output from the voltage controlled oscillator 105 varies depending on conditions such as a V-F characteristic variation of the voltage controlled oscillator 105. The variation range of the frequency output from the voltage controlled oscillator 105 corresponds to the spread width. Therefore, the variation range of the frequency output from the voltage controlled oscillator 105 varies, so that the spread width also varies. Hereinafter, a configuration example of a circuit which ensures a high spread frequency and further improves accuracy of the spread width will be described. It is possible to reduce spectra in a used frequency band by increasing the spread frequency. Further, it is possible to reduce the peak value of a spectrum remaining in the used frequency band by improving the accuracy of the spread width.

Figure 10:
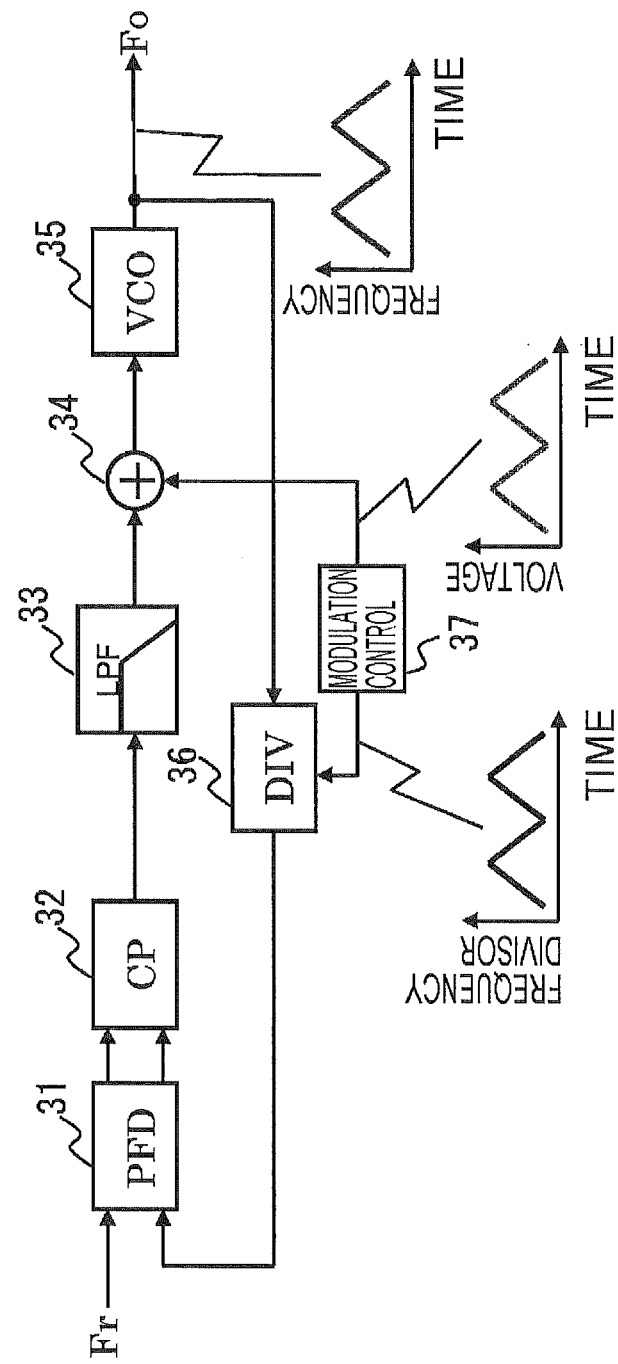
FIG. 10 is a configuration diagram of a circuit that performs a two-point modulation according to the first embodiment.

To ensure a high spread frequency, for example, as in a circuit shown in FIG. 10, there is a method that uses two-point modulation. The circuit in FIG. 10 includes a PFD 31, a CP 32, an LPF 33, an adder 34, a VCO 35, a DIV 36, and a modulation controller 37. The PFD 31, the CP 32, the LPF 33, the adder 34, the VCO 35, and the DIV 36 constitute a general PLL circuit. The modulation controller 37 performs division ratio modulation by outputting a modulation signal to the DIV 36. Further, the modulation controller 37 outputs a modulation signal to the adder 34. The modulation signal output from the modulation controller 37 to the adder 34 can change a voltage value output to the VCO 35. The adder 34 synthesizes a signal output from the LPF 33 and the modulation signal output from the modulation controller 37 and outputs the synthesized signal to the VCO 35. In the VCO 35, modulation is performed by the synthesized signal output from the adder 34. The modulation method performed using the two modulation signals output from the modulation controller 37 as described above is referred to as a two-point modulation method.

Figure 11:
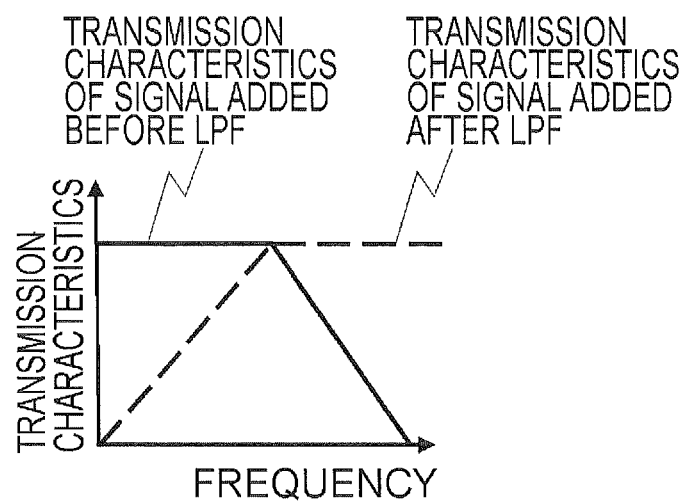
FIG. 11 is a diagram showing transmission characteristics of the circuit that performs the two-point modulation according to the first embodiment.

A low frequency modulation is performed by the division ratio modulation performed in the DIV 36 and a high frequency modulation is performed by the modulation performed in the VCO 35. The transmission characteristics of the modulation signal output from the modulation controller 37 to the VCO 35 through the DIV 36, PFD 31, CP 32, and LPF 33 are low-pass characteristics and limit the spread frequency. Moreover, the transmission characteristics of the synthesized signal which is output from the modulation controller 37 to the adder 34 and output from the adder 34 to the VCO 35 are high-pass characteristics. In this way, a signal having the low-pass characteristics and a signal having the high-pass characteristics are combined, so that it is possible to realize flat transmission characteristics of the modulation signal regardless of a PLL loop band. Thereby, it is possible to perform control with flat transmission characteristics even in a high frequency region. Therefore, a high spread frequency can be obtained. FIG. 11 shows the flat transmission characteristics when the signal having the low-pass characteristics and the signal having the high-pass characteristics are combined. The signal having the low-pass characteristics is indicated by a dashed line and the signal having the high-pass characteristics is indicated by a solid line.

Figure 12:
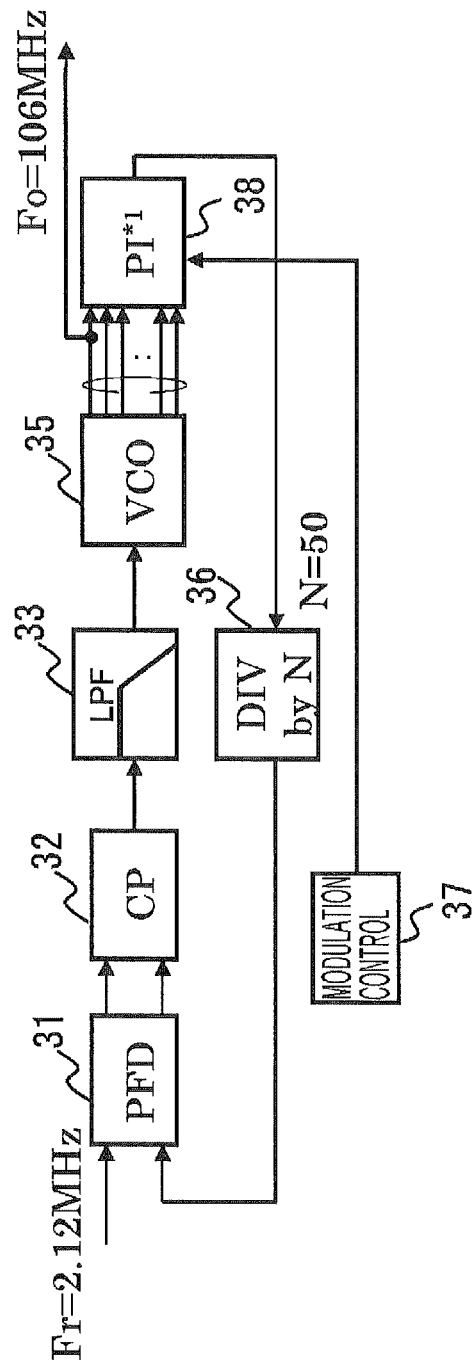
FIG. 12 is a configuration diagram of a circuit that controls a frequency divider according to the first embodiment.

Next, a configuration example for accurately controlling the spread width will be described. To control the spread width, generally, for example, modulation is performed by controlling a multiplication factor in the DIV 36. The PLL loop band needs to be a frequency band sufficiently lower than the input frequency for spurious suppression. When the loop band is about 200 kHz, basically, only the spread frequency of 200 kHz or less can pass the LPF 33. Therefore, when raising the spread frequency, the input frequency has to be raised. However, when the input frequency is raised, a ratio between the input frequency and the output frequency decreases, so that the multiplication factor in the DIV 36 needs to be decreased. At this time, to obtain a slightly changed spread width, it is necessary to increase the resolution of the multiplication factor and switch the multiplication factor. Therefore, to increase the resolution in the DIV 36, for example, as shown in FIG. 12, the output of the VCP 35 has 10 phases and further the 10 phases can be extracted by switching a clock edge at the accuracy of $\frac{1}{100}$ of the output clock period of the VCO 35 by using a phase interpolator 38 that can interpolate the 10 phases at $\frac{1}{10}$ interval.

When the phase difference between the signals of the 10 phases output from the VCO 35 is defined as one, the phase interpolator 38 can control the phases at a unit of $\frac{1}{10}$. Thereby, the multiplication factor can be controlled at a resolution of 0.01. When a spread width of 0.2% and a spread width resolution of 0.02% are desired to be obtained, it is enabled by quickly changing an apparent multiplication factor N by 0.01 at a time in a range between 50 and 50.1 by a $\Delta\Sigma$ modulation or the like. The clock controller 22 controls the spread spectrum of a clock by using a circuit for accurately adjusting the spread width and the spread frequency.

Figure 13:
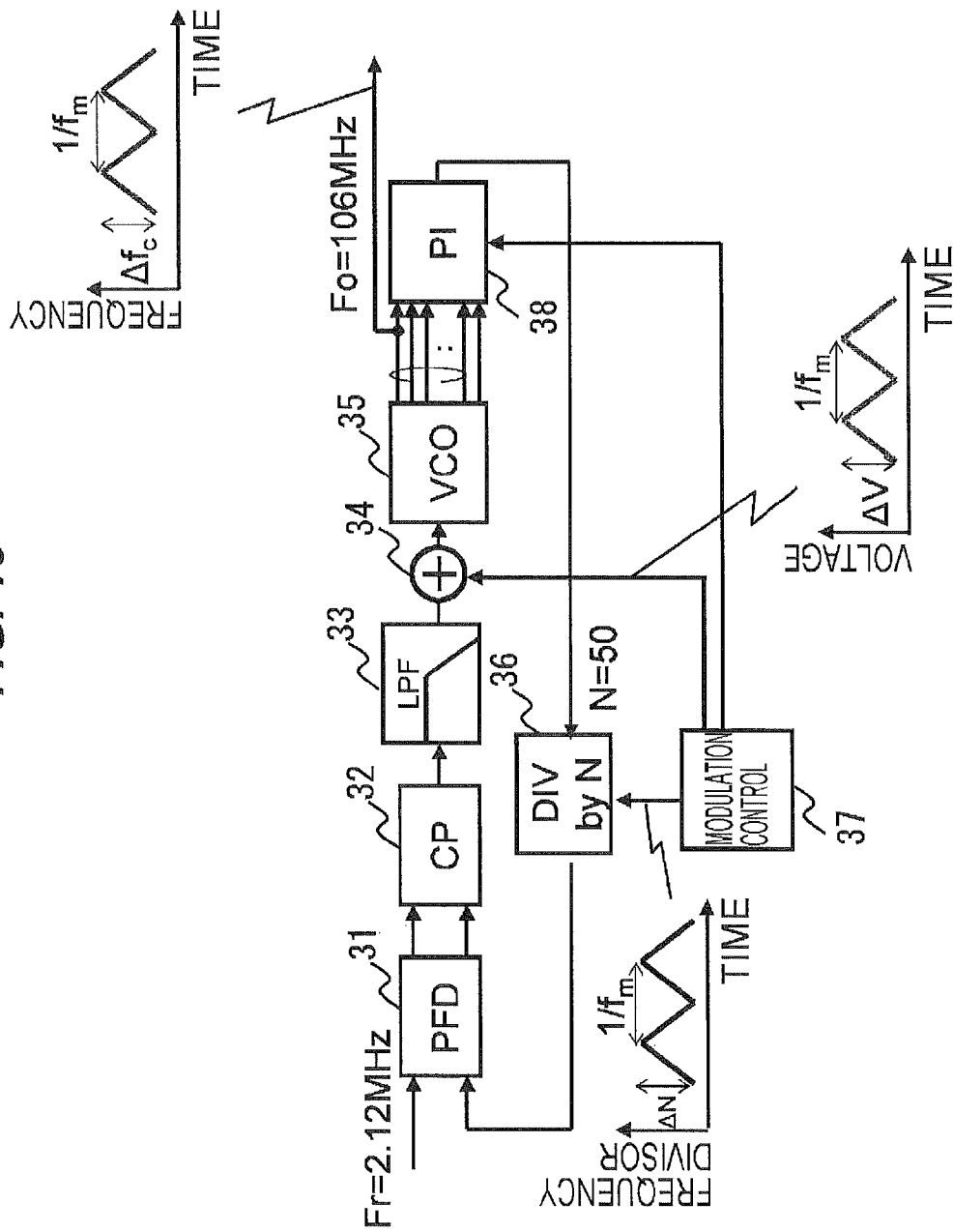
FIG. 13 is a configuration diagram of a clock controller according to the first embodiment.

Here, a configuration example of the clock controller 22 will be described with reference to FIG. 13. The clock controller 22 in FIG. 13 is a circuit in which the configuration that performs the two-point modulation in FIG. 10 and the configuration that improves the accuracy of the resolution in FIG. 12 are combined. Specifically, the circuit is obtained, in FIG. 10, after the output of the VCO 35 is changed to have 10 phases and the phase interpolator 38 that can further interpolate the 10 phases at $\frac{1}{10}$ interval is added.

Furthermore, as shown in FIG. 13, the modulation controller 37 outputs to the DIV 36 a modulation signal which changes a frequency divisor as the time elapses. Here, the modulation controller 37 performs control so as to set the period of the modulation signal output to the DIV 36 to 1/fm. Further, as shown in FIG. 13, the modulation controller 37 outputs to the adder 34 a modulation signal which changes a voltage as the time elapses. The modulation controller 37 performs control so as to set the period of the modulation signal output to the adder 34 to 1/fm. The modulation signals are output from the modulation controller 37 in this way, so that the VCO 35 can obtain an output frequency which has the spread frequency of $\Delta$fc and the period of 1/fm as shown in FIG. 13.

As described above, when the clock controller 22 and the clock control table 23 according to the first embodiment of the present invention are used, the number of spectra of the reception signal in the used frequency band can be only one and further the peak value of the spectrum in the used frequency band can be reduced. Thereby, it is possible to reduce the effect of interference given from the clock harmonic to the sub-channel.

Second Embodiment

In the first embodiment, the spread frequency fm is set so that the number of spectra in the used frequency band after the spread spectrum is one. On the other hand, in a second embodiment, a method of setting the spread width when there is a plurality of spectra in the used frequency band will be described.

Figure 14:
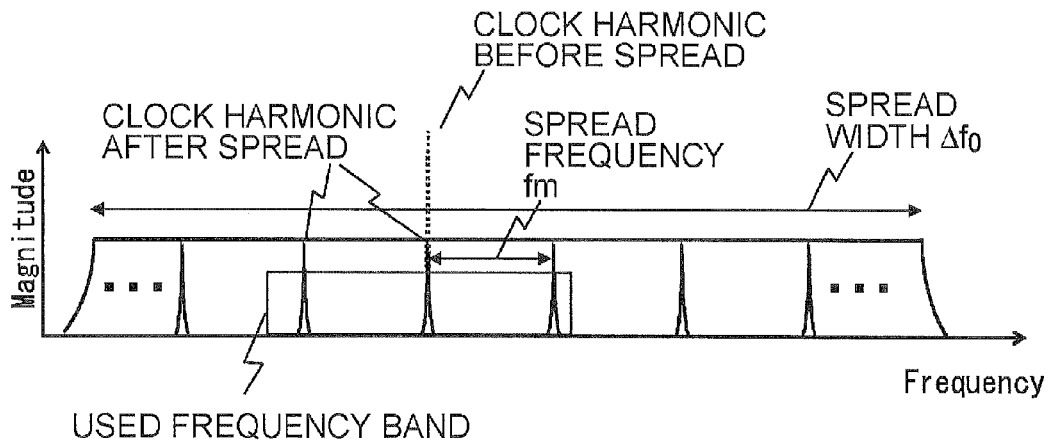
FIG. 14 is a diagram for explaining spread spectrum according to a second embodiment.

First, a value that can be set depending on a system condition and the like is set as the spread frequency. As a result, as shown in FIG. 14, when three spectra remain in the used frequency band, the spread width is set to reduce the peak values of the spectra.

Figure 15:
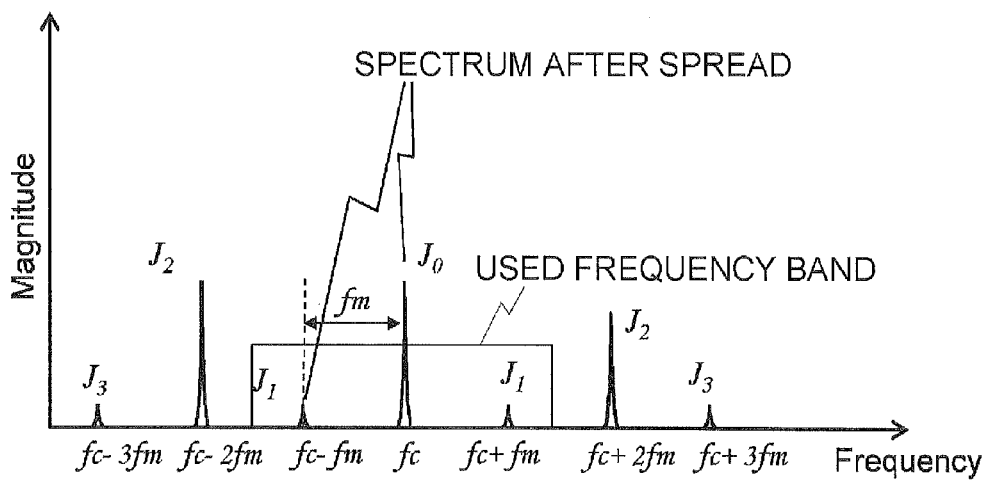
FIG. 15 is a diagram for explaining the spread spectrum according to the second embodiment.

The amplitudes of the spectra remaining in the used frequency band are controlled by using the Bessel function. For example, a case in which three spectra remain in the used frequency band as shown in FIG. 15 will be described. In FIG. 15, the clock harmonic frequency fc before the spread spectrum is located near the center of the used frequency band. Further, clock harmonics after the spread spectrum are located at positions of frequencies fc±fm which are apart from the clock harmonic frequency fc by the spread frequency fm. In this case, the degree of modulation m by which the value of the first kind and first-order Bessel function ($J_1$) approaches zero is extracted.

The spread width is determined by using the extracted degree of modulation m and the spread frequency fm. The spread width thus determined and the spread frequency are stored in the clock control table 23. As a result, the spread width determined based on the degree of modulation m by which the value of the first kind and first-order Bessel function ($J_1$) approaches zero is used, so that, as shown in FIG. 15, the peak values of the two spectra remaining in the used frequency band can be reduced and the effect of interference by the clock harmonic can be suppressed.

Figure 16:
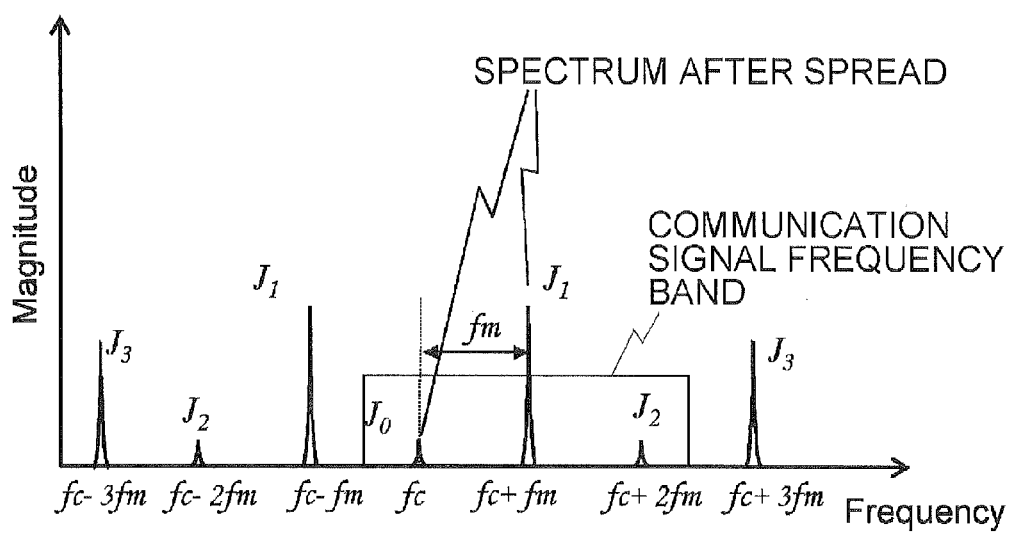
FIG. 16 is a diagram for explaining the spread spectrum according to the second embodiment.

Next, an example in which the peak value of spectrum is reduced will be described with reference to FIG. 16. In FIG. 16, three spectra remain in the used frequency band. Moreover, the clock harmonic frequency fc before the spread spectrum is located near an edge of the used frequency band. In this case, the degree of modulation m by which the first kind and zeroth-order Bessel function ($J_0$) and the first kind and second-order Bessel function ($J_2$) approach zero is extracted. Further, the spread width determined based on the extracted degree of modulation m is stored in the clock control table 23. As a result, the peak values of the spectra at the clock harmonic frequencies fc and fc+2fm can be reduced and the effect of interference by the clock harmonic can be suppressed.

As described above, when the clock controller 22 and the clock control table 23 according to the second embodiment of the present invention are used, even if the spectra remain in the used frequency band, the peak values of spectra are reduced, so that it is possible to reduce the effect of interference given from the clock harmonic to the sub-channel.

Figure 17:
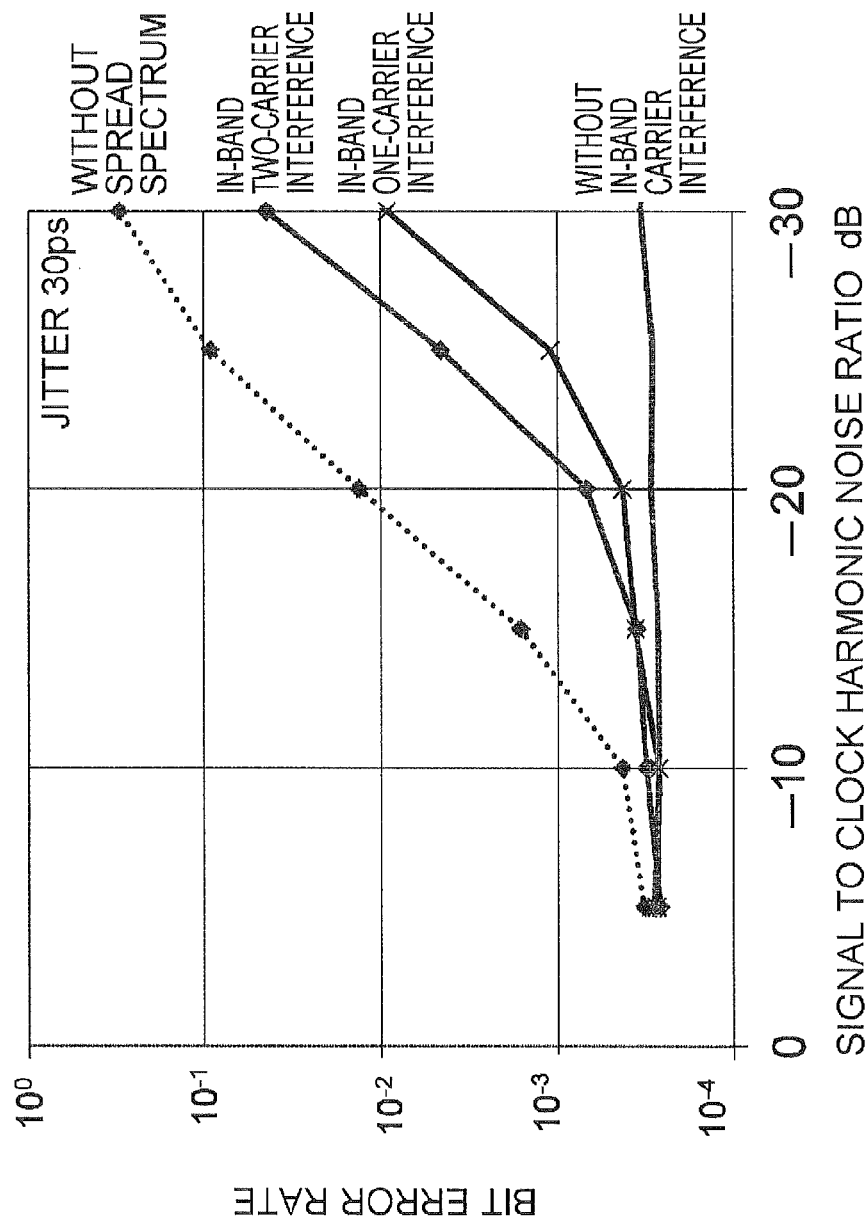
FIG. 17 is a diagram for explaining an improvement effect of signal reception quality according to the first and second embodiments.

Here, a signal reception quality improvement effect when the first and second embodiments are used will be described with reference to FIG. 17. FIG. 17 is a graph analyzing bit error rate which indicates reception quality of one segment broadcasting as an example of digital wireless communication. Specifically, the bit error rate when a clock harmonic is added to a communication signal is analyzed. As compared with a case without the spread spectrum, if the spread spectrum is controlled so that there is no carrier interference in the used frequency band as in the first embodiment, even when the clock harmonic increases, the bit error rate does not degrade. As in the second embodiment, when two peak values in the used frequency band are reduced and one spectrum interferes with carrier, the bit error rate is improved compared with a case in which no spread spectrum is performed. Similarly, when one peak value in the used frequency band is reduced and two spectra interfere with carrier, the bit error rate is improved compared with a case in which no spread spectrum is performed.

Third Embodiment

Figure 18:
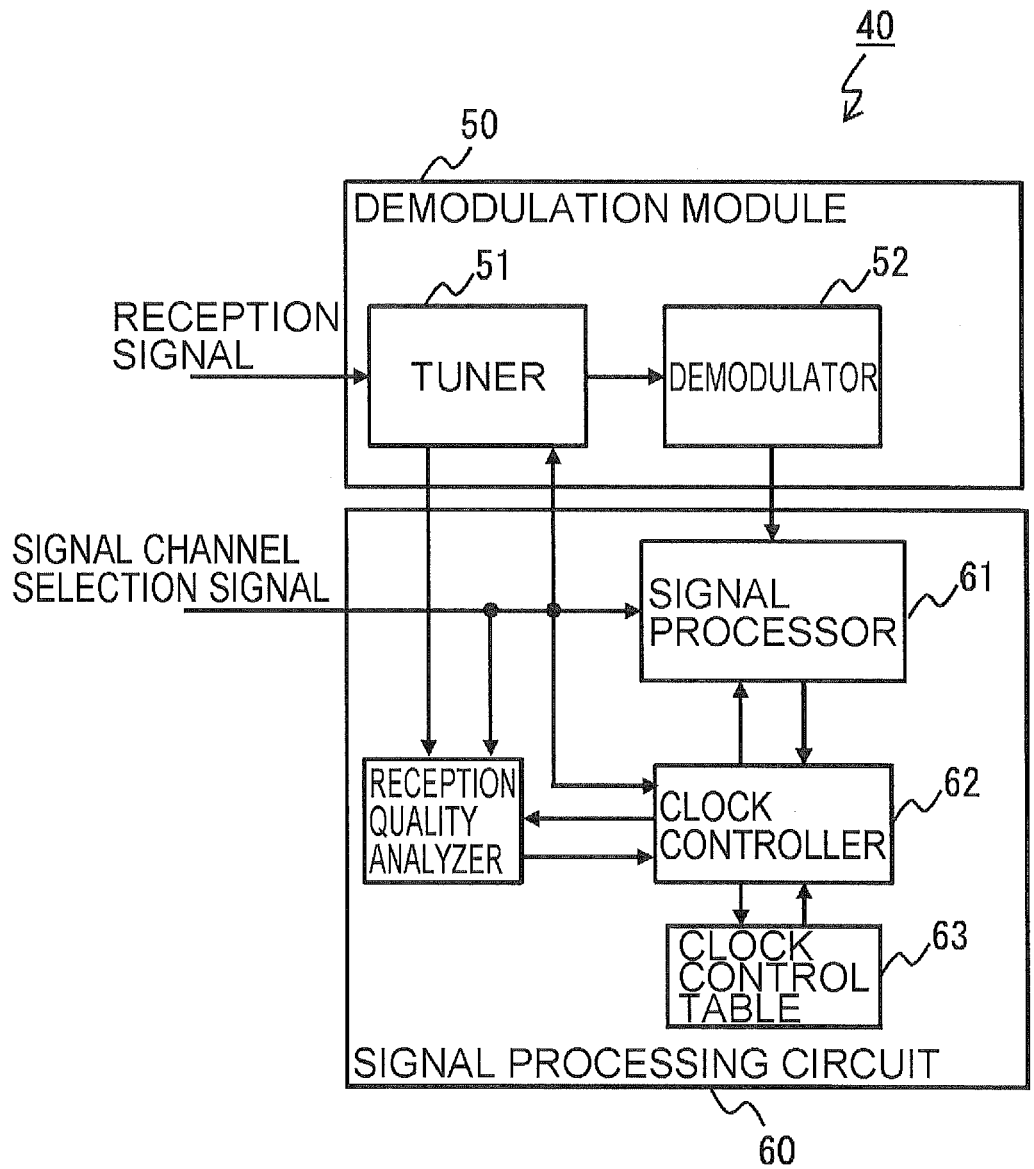
FIG. 18 is a configuration diagram of a demodulation device according to a third embodiment.

Next, a configuration example of a demodulation device 40 according to a third embodiment of the present invention will be described with reference to FIG. 18. Here, the configuration example of the demodulation device 40 will be described focusing on the difference from the demodulation device 1 in FIG. 1. The demodulation device 40 includes a demodulation module 50 and a signal processing circuit 60. The demodulation module 50 has a tuner 51 and a demodulator 52. The signal processing circuit 60 has a signal processor 61, a clock controller 62, a clock control table 63, and a reception quality analyzer 64.

Figure 19:
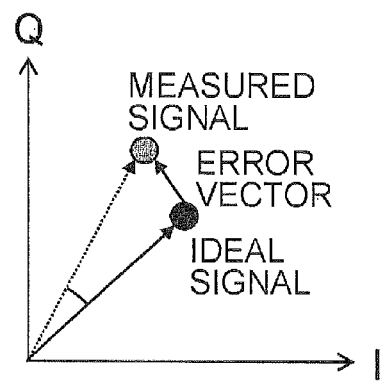
FIG. 19 is a diagram showing an error vector amplitude according to the third embodiment.

The tuner 51 outputs a reception signal to the reception quality analyzer 64. The reception quality analyzer 64 analyzes reception quality of the reception signal output from the tuner 51 and determines whether or not the reception quality is equal to or smaller than a threshold value. For example, the tuner 51 analyzes the reception quality by using an error vector amplitude (EVM) shown in FIG. 19. FIG. 19 represents the reception signal by using an in-phase component (I component) and an orthogonal component (Q component) of the signal. The EVM is a difference between an ideal signal and a measured signal.

Figure 20:
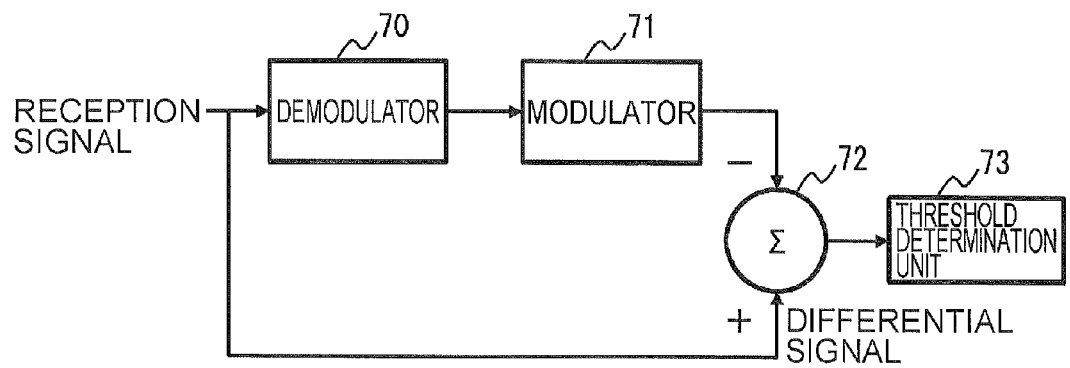
FIG. 20 is a configuration diagram of a reception quality analyzer according to the third embodiment.
Figure 21:
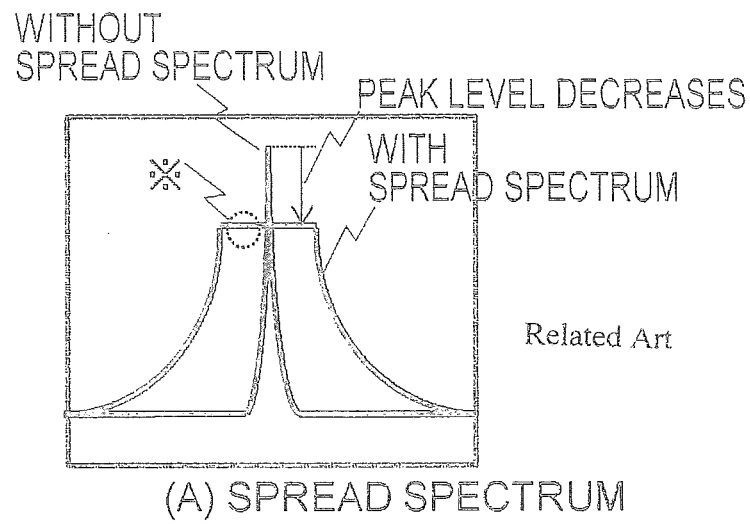
FIG. 21 is a diagram for explaining an effect of a general spread spectrum.
Figure 22:
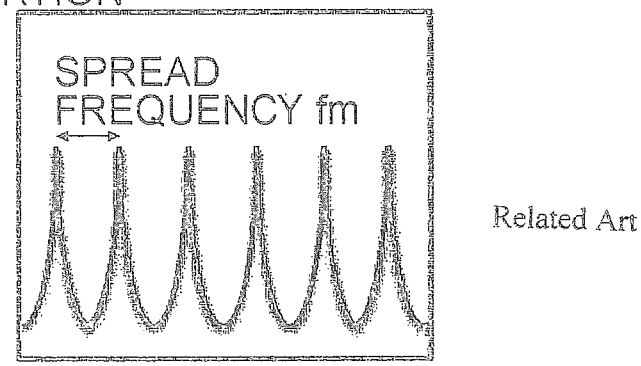
FIG. 22 is a diagram showing a plurality of spectra generated after the general spread spectrum.

Here, a configuration example of the reception quality analyzer 64 will be described with reference to FIG. 20. The reception quality analyzer 64 has a demodulator 70, a modulator 71, a subtracter 72, and a threshold determination unit 73. The demodulator 70 demodulates the signal output from the tuner 51. When the demodulator 70 demodulates the signal, the demodulator 70 performs an equalization process, an error correction process and the like and removes the noise component generated during communication. The demodulator 70 outputs the demodulated signal to the modulator 71.

The modulator 71 performs a modulation process on the signal output from the demodulator 70. The modulator 71 outputs the modulated signal to the subtracter 72. In other words, the demodulator 70 and the modulator 71 perform control so that the signal output from the tuner 51 approaches the ideal signal in FIG. 19.

The subtracter 72 outputs a difference between the signal output from the tuner 51 and the signal output from the modulator 71, that is, the EVM, to the threshold determination unit 73. In other word, the subtracter 72 outputs a difference between the signal output from the tuner 51 and the ideal signal to the threshold determination unit 73.

The threshold determination unit 73 determines whether or not the reception quality is good by using a signal to noise ratio (SNR) corresponding to the EVM and a predetermined threshold value. The formula (7) is used to convert the EVM to the SNR, for example, in 64QAM.

[Formula 7]

$$SNR = -\left[3.7 + 20\log_{10}\left(\frac{EVM}{100\%}\right)\right] \quad (7)$$

The threshold determination unit 73 may observe the EVM for each sub-carrier and perform a threshold determination by comparing the SNR with the threshold value. Alternatively, the threshold determination unit 73 may observe only the EVM of a sub-carrier of a clock harmonic and perform the threshold determination. In this case, the reception quality analyzer 64 has information of the frequency position of the clock harmonic and an interference sub-carrier for each used channel in advance and determines an interference sub-carrier to be observed on the basis of the signal channel selection signal.

As described above, when the demodulation device 40 according to the third embodiment of the present invention is used, it is possible to perform control so as to perform the spread spectrum only when the reception quality degrades. Thereby, the spread spectrum is not performed when the reception quality is good and data can be normally demodulated even when the effect of interference by the harmonic is received. Therefore, a processing load of the demodulation device 40 can be reduced.

Note that, the present invention is not limited to the above embodiments, but can be properly changed in a range without departing from the gist of the invention.

What is claimed is:

1. A demodulation device comprising:
a signal extraction unit which extracts a signal in a predetermined used frequency band from a reception signal;
a clock controller which disperses a harmonic of a clock signal in the used frequency band of the reception signal and controls an amplitude of a harmonic remaining in the used frequency band after the dispersion on a basis of a spread frequency used for the dispersion and a spread width of the harmonic; and
a demodulation unit which demodulates the reception signal by using a signal output from the signal extraction unit and a clock signal output from the clock controller.

2. The demodulation device according to claim 1, wherein the signal extraction unit extracts a signal in the predetermined used frequency band on a basis of a channel selection signal which gives a notification of a used channel of the reception signal.

3. The demodulation device according to claim 1, wherein the signal extraction unit extracts a signal in a used frequency band corresponding to channel information selected by a user.

4. The demodulation device according to claim 1, wherein the signal extraction unit extracts a signal in a used frequency band corresponding to communication channel information used between a base unit which supplies a wireless LAN radio wave and a cordless handset which receives the wireless LAN radio wave.

5. A spread spectrum method, comprising:
dispersing, using a clock control circuit, a harmonic of a clock signal in a used frequency band of a reception signal; and
after dispersing the harmonic, controlling an amplitude of a harmonic remaining in the used frequency band on a basis of a spread frequency used for the dispersion and a spread width of the harmonic.

6. The spread spectrum method according to claim 5, further comprising extracting, when controlling the amplitude of the harmonic, the spread frequency and the spread width from a clock control table storage unit which manages a used channel associated with the used frequency band of the reception signal, the spread frequency,
and the spread width in association with each other on a basis of a signal channel selection signal which gives a notification of the used channel of the reception signal.

7. The spread spectrum method according to claim 5, further comprising not performing, when controlling the amplitude of the harmonic, amplitude control of the harmonic when a reception quality value of the reception signal is equal to or greater than a predetermined threshold value and the reception quality is determined to be good, and performing the amplitude control of the harmonic when the reception quality value of the reception signal is less than the predetermined threshold value and the reception quality is determined not to be good.

8. The spread spectrum method according to claim 7, wherein the reception quality is determined on a basis of an amplitude of a differential signal between the reception signal and an ideal signal.

\* \* \* \* \*